Patented Oct. 21, 1952

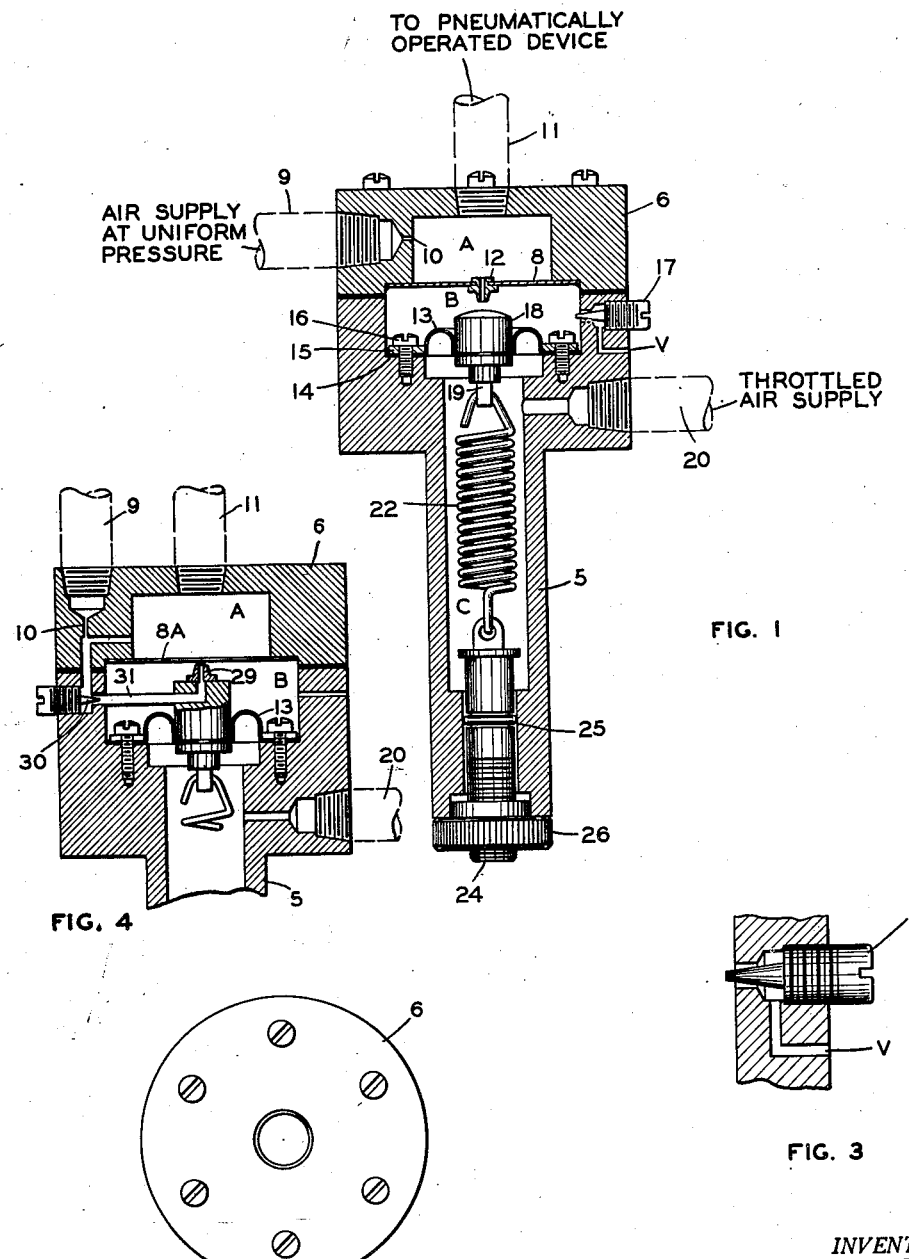

2,614,583

UNITED STATES PATENT OFFICE 2,614,583

PILOT RELAY VALVE

Samuel S. Di Maggio, Jr., Rochester, N. Y., assignor to Taylor Instrument Companies, Rochester, N. Y., a corporation of New York Application August 18, 1949, Serial No. 110,985

6 Claims. (Cl. 137—688)

This invention relates to a snap-acting pilot or relay valve having an adjustable dead spot and an adjustable set point.

One of the main features of the present invention relates to the novel construction and arrangement of the several parts of a pilot relay valve wherein the adjustable dead spot thereof can be determined at will and wherein the set point, that is the pressure at which the valve will close, can be readily adjusted as desired.

The various other features and advantages of the invention will appear from the detailed description and claims when taken with the drawings in which Fig. 1 is a vertical section taken through the pilot valve of the present invention, Fig. 2 is a top view of the valve, Fig. 3 is a sectional view showing the detailed construction of a needle valve used in connection with the present pilot relay valve, and Fig. 4 shows a modified form of the invention.

Referring to the drawing, the numeral 5 designates the body and the numeral 6 designates the top cap of the pilot or relay valve of this invention. This body which is preferably circular in cross section, is hollow to provide a longitudinally extending cylindrical bore which is closed at its lower end except for an aperture serving a purpose to be described. The upper end of the bore opens into an enlarged recess defined by the stepped internal side walls of the upper portion of the body which are circular in cross section. Top cap 6 which has a recess therein of circular cross section, has a rigid circular plate 8 soldered to its stepped lower edge to define the chamber A. The cap 6 is fastened by suitable screws in sealed relation to the top edge of the body so that the rigid plate 8 defines the upper side of the chamber B. The diameter of the chamber A is herein illustrated as being less than the diameter of the chamber B but the invention is not so limited.

The side of the top cap has a threaded opening in which there is connected a pipe 9 communicating with a source of compressed air at uniform pressure, such as twenty pounds per square inch. A restriction such as a sapphire 10 with a fine orifice therethrough (such as .010" in diameter), limits the passage of compressed air to chamber A. The top of the cap has a threaded opening in which there is connected an outlet pipe 11 of the relay valve, leading to a motor diaphragm valve or other pneumatically operated valve (not shown). The center of the diaphragm 8 is provided with a nozzle 12 having a bore therethrough (of the order of .025" in diameter) to permit passage of compressed air between the chambers A and B. The lower side of chamber B is defined by a molded flexible diaphragm 13 having its margin clamped in sealed relation to the annular shoulder 14 of the body by means of a ring 15 and the screws 16. The side wall of the valve body has therein vent V leading from the chamber B to the atmosphere. This vent is adjusted by a needle valve 17 having a screw-type head to control the desired back pressure in chamber B. This pressure determines the value of the dead spot or dead range. The center of the diaphragm 13 carries a baffle 18 having its upper or spheriodal surface in cooperating relation to the nozzle 12. A stem 19 integral with the lower part of the baffle, passes in sealed relation through the diaphragm 13, with its lower end having an opening therein. The diaphragm 13 together with the cylindrical bore at the lower portion of the valve body defines a chamber C. Compressed air at a controlled or throttled pressure, determined by a pneumatic controller of the type generally disclosed in Tate et al., Patent 2,361,885, granted October 31, 1944, is supplied through a pipe 20 into the chamber C. The pressure of this air serves to move the diaphragm 13 and thereby determines the location of the baffle 18 with respect to the nozzle 12. A coil spring 22 at its upper end engages the opening in the lower part of the stem 19, while the other end of this spring engages an aperture in the upper end of the adjusting rod 24. The lower portion of the adjusting rod 24 extends in sealed relation through a sealing O-ring 25 and through the opening in the lower end of the body. The lower end of the rod 24 is threaded for engagement by the knurled adjusting nut 26 which contacts the lower end of the body 5. It will be understood that as the nut 26 is adjusted along the threaded portion of the rod 24, the tension on the spring 22 will be adjusted accordingly, so that the set point of the pilot valve can be adjusted to various desired values within the range of the spring 22.

In the operation of the relay valve, let it be assumed that a uniform supply of compressed air, for example, at twenty pounds per square inch, is supplied through the pipe 9 and restriction 10 to the chamber A. The pressure in the chamber A and B are each adjusted to a given value, for example, one pound per square inch. This adjustment is effected by means of the vent V as determined by the needle valve 17. Whenever the air pressure in the chamber C under the diaphragm 13, is greater than the pressure in the chamber B, plus the force of the spring 22, the diaphragm raises the baffle 18 so that it begins to seal off the nozzle 12. As the nozzle is being thus sealed off the pressure in chamber B decreases rapidly, approaching zero value thereby allowing the diaphragm 13 to snap the baffle 18 upward into engagement with the nozzle 12 to completely seal the same.

The set point or the distance between the nozzle and baffle is normally maintained at .010", by means of the adjusting nut 26. The provision of the adjusting nut permits various desired adjustments of the set-point of the relay valve within the range of the biassing spring 22 while maintaining the same dead spot or dead range for this valve. On the other hand, if it is desired to maintain a given set-point of the relay valve, the dead range thereof can be adjusted at will by various adjustments of the needle valve 17 which serves to increase or decrease as desired, the back pressure in the chamber B. However, this means that the minimum operating pressure will be equal to the pressure in chamber B. It is obvious, of course, that with no back pressure in chamber B, the output air pressure can be throttled. Increasing or decreasing the capacity of chamber A, will directly affect the time in which full output pressure is obtained.

In Fig. 4, there is illustrated a slightly modified form of relay valve in accordance with this invention. In this form, the plate 8a which separates chambers A and B is imperforate. Chamber B is provided with a fixed vent to the atmosphere but it will be understood that this vent can be made adjustable by the use of a needle valve similar to valve 17 of Fig. 1. In this form of the invention, the flexible diaphragm 13, instead of carrying the baffle 18, carries the nozzle 29 in a position to engage the lower surface of the plate 8a which now serves as a baffle. Compressed air at the uniform pressure supplied through the sapphire restriction 10 to chamber A, also passes through the adjustable restriction 30, in the form of a needle valve, and thence through the flexible conduit 31 to the nozzle 29. The operation of this modified relay valve is identical with the relay valve of Fig. 1, so that further description is unnecessary.

Dead spot is herein defined as the largest range of values of the controlled variable to which the measuring means or controlled means does not respond.

While two forms of the present relay valve have been disclosed, it will be understood that there can be other modified forms thereof within the scope of the following claims, without departing from the spirit of the present invention.

What I claim is:

1. In a device of the class described, a hollow body, means including a plate and a flexible diaphragm spaced therefrom dividing said body into a primary chamber, a secondary chamber and a tertiary chamber, a source of pressure fluid at a predetermined pressure connected to the primary chamber through a restricted passage, said plate having an orifice therein larger than said restricted passage and permitting communication between said primary and secondary chambers, a member carried by said diaphragm and movable thereby into positions to open and close said orifice, means for supplying pressure fluid into said tertiary chamber at a pressure throttled in accordance with a given variable, said secondary chamber being provided with a restricted vent to the atmosphere of such size relative to said orifice that a substantial back pressure is provided in said secondary chamber when said orifice is open, and an output pipe communicating with said primary chamber.

2. In a device of the class described, a hollow body, means including a plate and a flexible diaphragm spaced therefrom dividing said body into a primary chamber, a secondary chamber and a tertiary chamber, said plate having an orifice therein permitting communication between said primary and secondary chambers, a member carried by said diaphragm and having a spheroid surface movable thereby into positions to open and close said orifice, means for supplying pressure fluid into said tertiary chamber at a pressure throttled in accordance with a given variable, said secondary chamber being provided with a restricted vent to the atmosphere of such size relative to said orifice that a substantial back pressure is provided in said secondary chamber when said orifice is open, a source of pressure fluid at a predetermined pressure connected to said primary chamber through a restricted passage smaller than said orifice, and an outlet pipe communicating with said primary chamber.

3. In a device of the class described, a hollow body, means including a plate and a flexible diaphragm spaced therefrom dividing said body into a primary chamber, a secondary chamber and a tertiary chamber, said plate having an orifice therein permitting communication between said primary and secondary chambers, a member carried by said diaphragm and movable thereby into positions to open and close said orifice, means for supplying pressure fluid into said tertiary chamber at a pressure throttled in accordance with a given variable, said secondary chamber being provided with an adjustable vent to the atmosphere of such size relative to said orifice that a substantial back pressure is provided in said secondary chamber when said orifice is open, a source of pressure fluid at a predetermined pressure connected to said primary chamber through a restricted passage smaller than said orifice, and and outlet pipe communicating with said primary chamber.

4. In a device of the class described, a hollow body, means including a plate and a flexible diaphragm spaced therefrom dividing said body into a primary chamber, a secondary chamber and a tertiary chamber, said plate having an orifice therein permitting communication between said primary and secondary chambers, a member carried by said diaphragm and movable thereby into positions to open and close said orifice, and adjustable biasing spring tending to oppose the movement of said diaphragm and said member toward said orifice, means for supplying pressure fluid into said tertiary chamber at a pressure throttled in accordance with a given variable, said secondary chamber being provided with an adjustable vent to the atmosphere of such size relative to said orifice that a substantial back pressure is provided in said secondary chamber when said orifice is open, a source of pressure fluid at a predetermined pressure connected to said primary chamber through a restricted passage smaller than said orifice, and an outlet pipe communicating with said primary chamber.

5. In a device of the class described, a hollow body, means including a plate and a flexible diaphragm spaced therefrom dividing said body into a primary chamber, a secondary chamber and tertiary chamber, a source of pressure fluid at a predetermined pressure connected to the primary chamber through a restricted passage, a nozzle larger than said restricted passage discharging into said secondary chamber and supplied with fluid at a pressure substantially equal to that supplied to said primary chamber, means including said diaphragm for controlling the discharge of pressure fluid from said nozzle, means for supplying pressure fluid into said tertiary chamber at a pressure throttled in accordance with a given variable, said secondary chamber being provided with a vent to the atmosphere of such size relative to said nozzle that a substantial back pressure is provided in said secondary chamber when said nozzle is open, and an output pipe communicating with a said primary chamber.

6. In a device of the class described, a hollow body, means including a plate and a flexible diaphragm spaced therefrom dividing said body into a primary chamber, a secondary chamber and tertiary chamber, a source of pressure fluid at a predetermined pressure connected to the primary chamber through a restricted passage, a nozzle larger than said restricted passage discharging into said secondary chamber and supplied with fluid at a pressure substantially equal to that supplied to said primary chamber, said nozzle being movable by said diaphragm into various positions with respect to said plate to modify the discharge of fluid from the nozzle, means for supplying pressure fluid into said tertiary chamber at a pressure throttled in accordance with a given variable, said secondary chamber being provided with a vent to atmosphere of such size relative to said nozzle that a substantial back pressure is provided in said secondary chamber when said nozzle is open, and an output pipe communicating with a said primary chamber.

SAMUEL S. DI MAGGIO, Jr.

REFERENCES CITED

The following references are of record in the file of this patent:

UNITED STATES PATENTS

| Number | Name | Date |
|---|---|---|
| 1,680,750 | Smoot | Aug. 14, 1928 |
| 2,386,108 | Gess | Oct. 2, 1945 |